United States Patent
Saito et al.

(10) Patent No.: US 9,023,530 B2
(45) Date of Patent: May 5, 2015

(54) NON-AQUEOUS ELECTROLYTE SECONDARY BATTERY

(75) Inventors: Takaya Saito, Utsunomiya (JP); Yasutaka Kogetsu, Suita (JP); Takashi Takeuchi, Hirakata (JP); Hidekazu Hiratsuka, Kadoma (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1979 days.

(21) Appl. No.: 11/371,286

(22) Filed: Mar. 9, 2006

(65) Prior Publication Data

US 2006/0204849 A1  Sep. 14, 2006

(30) Foreign Application Priority Data

Mar. 9, 2005 (JP) .................................. 2005-065260
Feb. 27, 2006 (JP) .................................. 2006-050202

(51) Int. Cl.
  *H01M 4/13* (2010.01)
  *H01M 4/58* (2010.01)
  (Continued)

(52) U.S. Cl.
  CPC ............ *H01M 4/131* (2013.01); *H01M 4/1391* (2013.01); *H01M 4/485* (2013.01); *H01M 4/525* (2013.01); *H01M 10/0525* (2013.01); *H01M 10/0587* (2013.01); *H01M 2004/021* (2013.01);
  (Continued)

(58) Field of Classification Search
  CPC .... H01M 4/131; H01M 4/1391; H01M 4/525

USPC ............................................. 429/231.95, 223
See application file for complete search history.

(56) References Cited

U.S. PATENT DOCUMENTS

| 2004/0180263 A1* | 9/2004 | Kase et al. ................. 429/231.3 |
| 2005/0106463 A1* | 5/2005 | Kikuchi et al. ............ 429/231.1 |
| 2005/0158546 A1* | 7/2005 | Shizuka ........................ 428/402 |

FOREIGN PATENT DOCUMENTS

| JP | 07-183047 A | 7/1995 |
| JP | 9-231973 A | 9/1997 |

(Continued)

OTHER PUBLICATIONS

"Specific gravity." Encyclopedia Britannica. 2009. Encyclpedia Britannica Online. May 29, 2009 <http://www.britannica.com/EBchecked/topic/558700/specific-gravity>.*

*Primary Examiner* — Eugenia Wang
(74) *Attorney, Agent, or Firm* — McDermott Will & Emery LLP

(57) ABSTRACT

To improve high temperature storage characteristic of a non-aqueous electrolyte secondary battery suitable for high input/output application, the structure of a positive electrode active material is optimized. The non-aqueous electrolyte secondary battery includes a positive electrode; a negative electrode; a separator interposed between the positive and negative electrodes; and a non-aqueous electrolyte. The positive electrode active material includes secondary particles, each formed of an aggregate of primary particles. A value ($V_{Pr}$) defined by the formula: $V_{Pr}=(1-C/D)/(A^2 \times B^3)$ is not less than 0.0005 and not greater than 0.04, where an average particle size of the primary particles is A μm, an average particle size of the positive electrode active material is B μm, a tap density of the positive electrode active material is C g/ml, and a true specific gravity of the positive electrode active material is D g/ml.

2 Claims, 3 Drawing Sheets

(51) Int. Cl.
  *H01M 4/00* (2006.01)
  *H01M 4/131* (2010.01)
  *H01M 4/1391* (2010.01)
  *H01M 4/485* (2010.01)
  *H01M 4/525* (2010.01)
  *H01M 10/0525* (2010.01)
  *H01M 10/0587* (2010.01)
  *H01M 4/02* (2006.01)
(52) U.S. Cl.
  CPC ........ *H01M 2004/028* (2013.01); *Y02E 60/122* (2013.01)

(56) References Cited

FOREIGN PATENT DOCUMENTS

| | | | |
|---|---|---|---|
| JP | 10-172569 A | | 6/1998 |
| JP | 2001-243951 A | | 9/2001 |
| JP | 2002-104827 A | | 4/2002 |
| JP | 2003-272629 A | | 9/2003 |
| JP | 2004-087492 A | | 3/2004 |
| JP | 2005-141983 A | | 6/2005 |
| JP | 2005-251717 A | | 9/2005 |
| WO | WO-03083969 | * | 10/2003 |
| WO | WO 2004102702 | * | 11/2004 |

* cited by examiner

F I G. 1
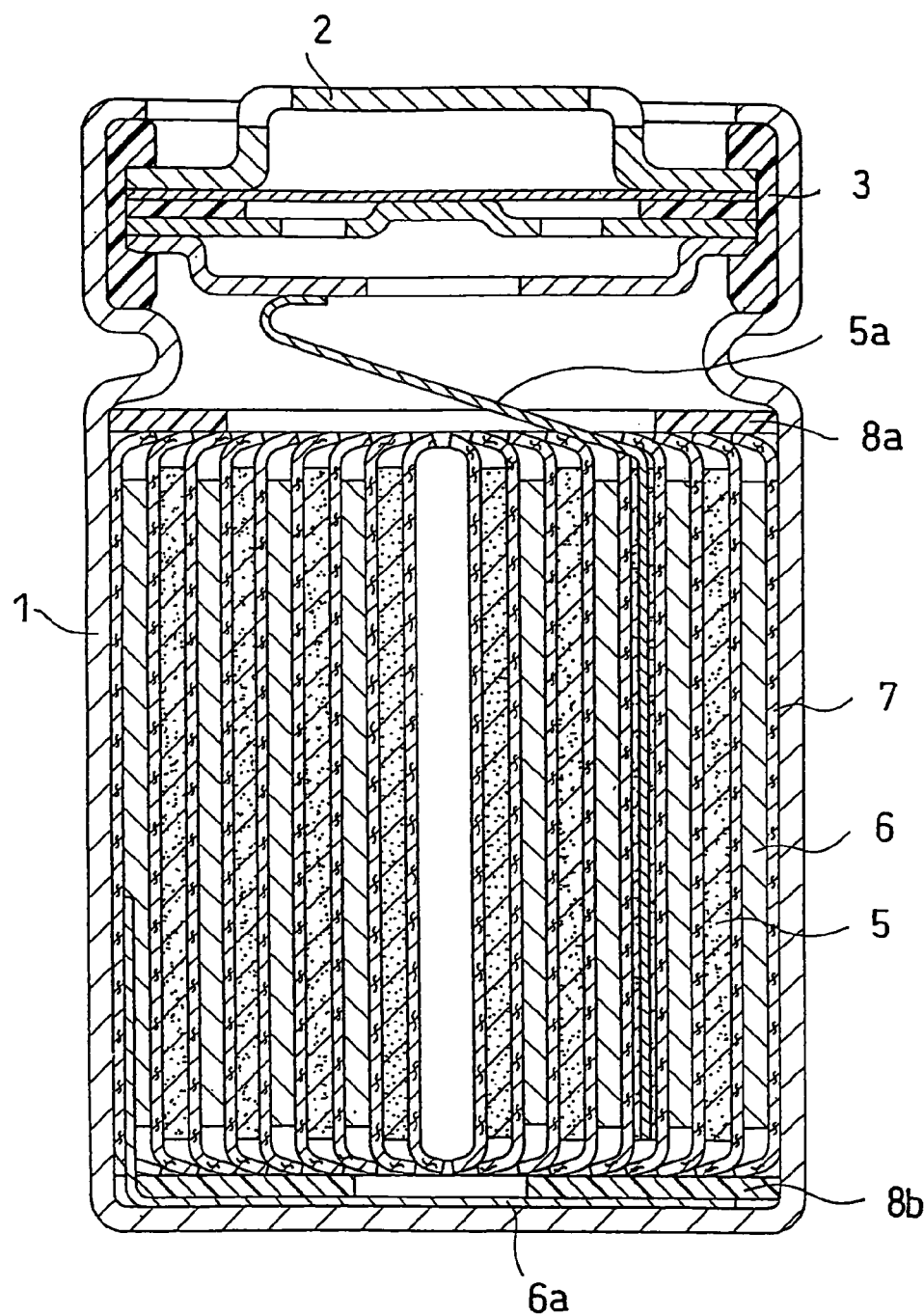

F I G. 4
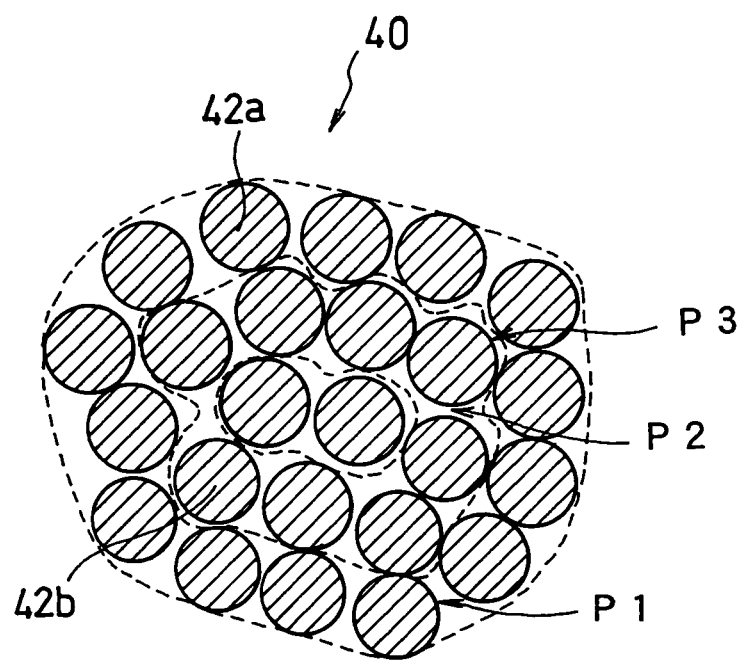

NON-AQUEOUS ELECTROLYTE SECONDARY BATTERY

FIELD OF THE INVENTION

The present invention relates to a non-aqueous electrolyte secondary battery suitable for high input/output application, and more particularly to an improvement of storage characteristic by optimizing the structure of a positive electrode active material.

BACKGROUND OF THE INVENTION

Non-aqueous electrolyte secondary batteries, particularly lithium ion secondary batteries, now have a high operating voltage and high energy density. They are commercialized as power sources for driving portable electronic equipment such as cell phones, notebook computers and video camcorders.

Lithium ion secondary batteries employ, as the positive electrode active material, a transition metal-containing composite oxide having a voltage as high as 4 V level. Specific examples of the positive electrode active material include: lithium-cobalt composite oxides having a hexagonal crystal structure (e.g., $LiCoO_2$ and one obtained by partially replacing Co in $LiCoO_2$ with Mg or Al); lithium-nickel composite oxides (e.g., $LiNiO_2$ and one obtained by partially replacing Ni in $LiNiO_2$ with Co, Al or Mn); lithium-manganese composite oxides having a spinel structure (e.g., $LiMn_2O_4$ and one obtained by partially replacing Mn in $LiMn_2O_4$ with Cr, Al or Ni); and lithium-titanium composite oxides (e.g., $Li_4Ti_5O_{12}$). A mixture composed of a plurality of composite oxides is also used. Among the above, the most widely used is $LiCoO_2$ because it can offer a high operating voltage and a high energy density.

Lithium ion secondary batteries employ, as the negative electrode active material, a material capable of absorbing and desorbing lithium ions. The most widely used is graphite because it can provide a flat discharge potential and a high capacity density.

These active materials are added with a binder such as polyvinylidene fluoride or polytetrafluoroethylene, and optionally, added with a conductive material such as acetylene black or graphite. A paste is prepared by mixing the above materials with a liquid component. The paste is applied to a metal foil made of aluminum or copper, followed by drying and rolling to produce an electrode plate. The electrode plate is then cut into a predetermined size to produce a sheet-like electrode.

In addition to the compact non-aqueous electrolyte secondary batteries for consumer use, the development of large non-aqueous electrolyte secondary batteries having a large capacity has also been accelerated in recent years. Particularly, the development of lithium ion secondary batteries for power storage and electric vehicle applications is being vigorously conducted. Currently, hybrid electric vehicles (HEVs) are considered promising in view of an environmental friendliness. Vehicles equipped with on-board nickel-metal hydride storage batteries have already been in mass production and available in the market. Trials have been vigorously made to combine a lithium ion secondary battery having a higher energy density than a nickel-metal hydride storage battery with a conventional engine or a fuel cell.

Unlike the compact lithium ion secondary batteries for consumer use, those for HEV application need to exhibit stable storage characteristic in any outside environment (in a high temperature environment of a hot summer day, in particular). Lithium ion secondary batteries for HEV application also need to instantly provide power assistance (output) to the main power source (e.g., an engine or fuel cell), or to regenerate power (input). For this reason, there is a growing demand for an electrode structure designed for high input/output application with a small internal resistance.

Under the circumstances, in order to improve storage characteristic, a positive electrode active material comprising primary particles of not greater than 2 μm and having a pore radius of not greater than 30 Å is proposed (Japanese Laid-Open Patent Publication No. Hei 9-231973). This proposal is intended to prevent the decomposition of organic solvent which selectively takes place in a void having a pore radius of not greater than 30 Å and to prevent the resulting decomposition product from covering the active material.

In order to improve high output characteristic, a positive electrode active material comprising secondary particles having an average particle size of 5 to 15 μm, each comprising an aggregate of primary particles having an average particle size of 0.3 to 1 μm is proposed. The positive electrode active material is represented by $Li(Ni-Co-M)O_2$, where M is at least one selected from the group consisting of Al, Ti and Sn. This proposal is intended to reduce the internal resistance of the non-aqueous electrolyte secondary battery (Japanese Laid-Open Patent Publication No. 2004-87492).

The proposal made by Japanese Laid-Open Patent Publication No. Hei 9-231973 is effective in improving storage characteristic only when the battery is deeply charged at a relatively low rate until the battery voltage reaches 4.2 V. However, for HEV application, about 100 batteries are typically connected in series, and each battery is not deeply charged to a voltage of 4.2 V. Such batteries for HEV application are typically charged at a rate 10 times or more higher than the compact batteries for consumer use. Accordingly, the state of charge (SOC) of each battery is further reduced due to polarization. When such batteries that are commonly charged to a low SOC are stored at a high temperature, the proposal of Japanese Laid-Open Patent Publication No. Hei 9-231973 cannot provide sufficient improvement of the storage characteristic.

BRIEF SUMMARY OF THE INVENTION

In view of the above, an object of the invention is to improve high temperature storage characteristic by optimizing the structure of a positive electrode active material for a non-aqueous electrolyte secondary battery suitable for high input/output application.

The present invention relates to a non-aqueous electrolyte secondary battery comprising: a positive electrode including a positive electrode active material; a negative electrode including a negative electrode active material; a separator interposed between the positive electrode and the negative electrode; and a non-aqueous electrolyte, wherein the positive electrode active material comprises secondary particles, each comprising an aggregate of primary particles, the primary particles comprising a transition metal-containing composite oxide capable of intercalating and deintercalating lithium ions and, wherein a value ($V_{Pr}$) defined by the formula: $(1-C/D)/(A^2 \times B^3)$, is not less than 0.0005 and not greater than 0.04, where an average particle size of the primary particles is A μm, an average particle size of the positive electrode active material is B μm, a tap density of the positive electrode active material is C g/ml, and a true density of the positive electrode active material is D g/ml.

An example of the negative electrode active material is a carbon material capable of absorbing and desorbing lithium ions.

Preferably, the transition metal-containing composite oxide capable of intercalating and deintercalating lithium ions is represented by the formula: $Li_xNi_{1-(y+z)}Co_yM_zO_2$, where $0.95 \leq x \leq 1.05$, $0.1 \leq y \leq 0.35$ and $0.01 \leq z \leq 0.35$, and the element M is at least one selected from the group consisting of Al, Mn, Ti, Mg, Mo, Y, Zr and Ca.

According to the finding of the present inventors, in the case of batteries which are charged and discharged at a low SOC such as those for HEV application, the greater the degradation after storage, the larger the amount of non-aqueous electrolyte present among the primary particles in the surface portion of a secondary particle of the positive electrode active material (hereinafter referred to as "amount of electrolyte in surface portion"). The amount of electrolyte in surface portion has a high correlation with the amount of film covering the positive electrode active material surface. Also, the amount of electrolyte in surface portion has a high correlation with a surface area of the primary particles. Accordingly, when the amount of electrolyte in surface portion is appropriate, the battery exhibits both favorable high input/output characteristic and excellent storage characteristic. When the amount is excessively low or high, the battery has poor storage characteristic.

In the synthesis of the positive electrode active material, the following two points should be noted to control the parameters (A to C) given above to be in an appropriate range with good reproducibility.

Firstly, when producing a transition metal hydroxide (e.g., $Co(OH)_2$), i.e., a raw material for the positive electrode active material, by precipitation, the tap density of the hydroxide is controlled to be in a desired range. More specifically, when an aqueous alkaline solution containing NaOH or the like is added dropwise to an aqueous solution of transition metal salts, for example, the neutralization conditions are adjusted.

Secondly, the obtained transition metal hydroxide is prebaked at a predetermined temperature to convert it to a transition metal oxide before reacting it with a lithium salt (e.g., LiOH or $Li_2CO_3$). Thereby, the primary particle size of the positive electrode active material can be controlled to be in a desired range.

In the positive electrode active material produced in the manner described above, the amount of electrolyte in surface portion in a low SOC battery is in an appropriate range. Accordingly, using the above-produced positive electrode active material, it is possible to achieve both good high input/output characteristic and storage characteristic.

A non-aqueous electrolyte secondary battery of the present invention is highly reliable because it can exhibit favorable storage characteristic even when it is exposed to a harsh environment at a low SOC. Even when the non-aqueous electrolyte secondary battery of the present invention is employed in a hybrid electric vehicle (HEV), both favorable high input/output characteristic and excellent storage characteristic can be achieved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a schematic cross sectional view of a non-aqueous electrolyte secondary battery of the present invention.

FIG. 4 is a schematic diagram showing analytical points of a positive electrode active material in determining an amount of electrolyte in surface portion.

DETAILED DESCRIPTION OF THE INVENTION

Figure 2:
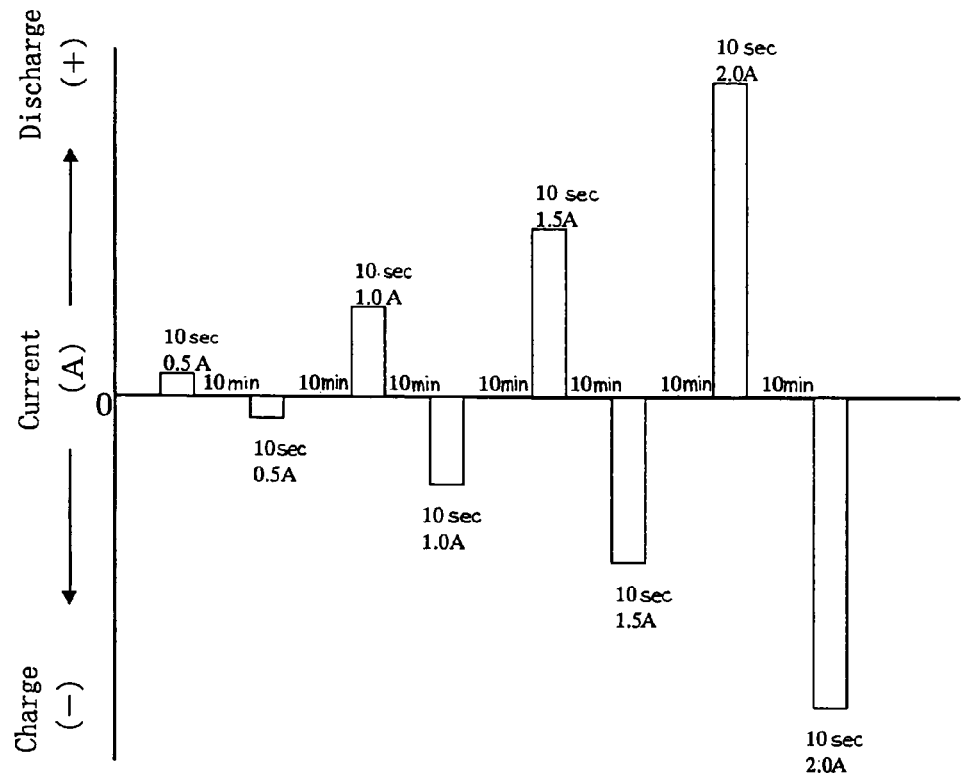
FIG. 2 shows a pattern of charge/discharge pulse performed in a current-voltage characteristic test.

A non-aqueous electrolyte secondary battery of the present invention comprises a positive electrode including a positive electrode active material comprising a transition metal-containing composite oxide capable of intercalating and deintercalating lithium ions; a negative electrode including a negative electrode active material; a separator interposed between the positive electrode and the negative electrode; and a non-aqueous electrolyte.

The positive electrode active material comprises secondary particles, each comprising an aggregate of primary particles. Further, a value ($V_{Pr}$) defined by the formula: $V_{Pr}=(1-C/D)/(A^2 \times B^3)$, is not less than 0.0005 and not greater than 0.04. Herein, an average particle size of the primary particles is A µm, an average particle size of the positive electrode active material is B µm, a tap density of the positive electrode active material is C g/ml, and a true density of the positive electrode active material is D g/ml.

When the value of $V_{Pr}$ is not less than 0.0005 and not greater than 0.04, the amount of electrolyte in surface portion at a low SOC becomes in an appropriate range. When the amount of electrolyte in surface portion is excessively large, if the battery at a low SOC is exposed to a high temperature environment, the amount of the non-aqueous electrolyte that decomposes at the surface portion of the positive electrode increases. This creates a large amount of film on the surface portion, resulting in an increase in electrode resistance, in other words, in poor storage characteristic. When the amount of electrolyte in surface portion is excessively small, on the other hand, the ion conductivity of the positive electrode active material decreases, resulting in poor high input/output characteristic. When the amount of electrolyte in surface portion is in an appropriate range, even if the battery at a low SOC is exposed to a high temperature environment, the formation of film on the surface portion can be prevented. In other words, the storage characteristic can be maintained while the high input/output characteristic can be maintained.

A description is now given of the value $V_{Pr}$ defined by $(1-C/D)/(A^2 \times B^3)$.

It is presumed that the amount of electrolyte in surface portion be controlled mainly by a void volume formed between the primary particles of the active material. Because C represents a tap density of the positive electrode active material, and D represents a true density of the positive electrode active material, $(1-C/D)$ represents a void volume of the positive electrode active material per unit volume. The factor $(1-C/D)$ is the total of void volume between the secondary particles and that between the primary particles. In order to determine the void volume between the primary particles, it is necessary to exclude the void volume between the secondary particles from $(1-C/D)$. However, it is difficult to clearly distinguish the void volume between the secondary particles and the void volume between the primary particles from each other.

Nevertheless, assuming that the secondary particles and the primary particles have the same particle shape, based on the general knowledge that the greater the particle size, the lower the tap density, the factor of the void volume between the secondary particles can be excluded from (1−C/D) for the sake of simplicity. More specifically, a value obtained by dividing (1−C/D) by a value ($B^3$) has a correlation with the void volume between the primary particles, because $B^3$ is proportional to an average volume per particle of the positive electrode active material. Moreover, a value ($V_{Pr}$) obtained by dividing (1−C/D)/($B^3$) by a value ($A^2$) has a correlation with the void volume per unit area of the primary particles, because $A^2$ is proportional to an average surface area per particle of the primary particles. The value $V_{Pr}$ also has a correlation with the amount of non-aqueous electrolyte that can be retained by the primary particles per unit area of the primary particles.

The methods for measuring the parameters A to D are described below.

In order to determine the average particle size A of the primary particles of the positive electrode active material, the positive electrode active material is first mixed with an epoxy resin, which is then cured to produce a cured product. The cured product is then polished, after which the cross section thereof is observed. By such an observation of the polished cross section, the diameters of the primary particles shown as approximate circles in the polished cross-section are measured. Then, the average value is calculated. The obtained average value can be regarded as an average particle size A of the primary particles. Among the approximate circles observed in the polished cross section, those having a small diameter are likely not to be polished along the diameters of the substantially spherical primary particles. Accordingly, the circles having a small diameter are preferably excluded from the calculation of the average particle size. More specifically, the diameters of at least 300 primary particles are measured to obtain a diameter data. Then, a top 10% largest subset of data is extracted from the diameter data obtained above. The average value of the extracted subset of data is calculated. Preferably, this obtained value is used as the average particle size A.

The value of A is preferably 0.1 to 1.5 μm. When the value of A is excessively large, the number of contact points between the primary particles decreases, which may cause difficulty in the formation of a secondary particle. Conversely, when the value of A is excessively small, the value of $V_{Pr}$ may become large, and the increase of direct current internal resistance tends to be high in the battery after storage.

The average particle size B of the positive electrode active material can be measured by a light-scattering particle size distribution analyzer, for example. Because the positive electrode active material is substantially spherical, the measuring method may be the dry method or wet method. The average particle size B can be measured directly from the active material before the production of the positive electrode. Alternatively, it can be measured using the active material separated from the positive electrode. A positive electrode active material is usually mixed with a binder for use. By immersing a part of the positive electrode in a solvent capable of dissolving or swelling the binder, and then applying ultrasound thereto, the positive electrode active material can be separated.

The value of B is preferably 3 to 15 μm. When the value of B is excessively large, the stability of the positive electrode active material paste decreases, and the change in viscosity thereof increases over time. As a result, mass-productivity decreases. Conversely, when the value of B is excessively small, the amount of active material filled in the positive electrode decreases, making it difficult to produce a high capacity battery.

The tap density C of the positive electrode active material can be determined by a powder tester (e.g., TPM-3 available from Tsutsui Scientific Instruments Co., Ltd.). More specifically, the positive electrode active material in an amount of 50 g is fed into a graduated cylinder specifically designed for the tester. The graduated cylinder is then set on the tester. Subsequently, an up-and-down vibration with 20 mm amplitude is applied to the graduated cylinder for one hour. The scale on the cylinder is read one hour after the application of the vibration to measure the volume of the positive electrode active material (V ml). By dividing the weight of the positive electrode active material (i.e., 50 g) by the volume V, the tap density C (i.e., 50/V) (g/ml) can be determined.

The value of C is preferably 2 to 3 g/ml. When the value of C is excessively large, the value of $V_{Pr}$ may become small, and the direct current internal resistance tends to be high in the battery before storage. Conversely, when the value of C is excessively small, the amount of active material filled in the positive electrode decreases, making it difficult to produce a high capacity battery.

The true density D of the positive electrode active material can be determined by the calculation based on a lattice constant of the active material measured by X-ray diffractometry.

The value of D preferably falls within the ±10% margin of error of the value obtained by computational chemistry method from a chemical composition of the positive electrode active material on the assumption that the positive electrode active material has a hexagonal crystal structure. When the value of D is excessively large or excessively small, the synthesis of the positive electrode active material may be insufficiently conducted, decreasing the initial capacity.

In order to adjust $V_{Pr}=(1-C/D)/(A^2 \times B^3)$ to be in 0.0005 to 0.04, as described previously, the tap density of the transition metal hydroxide serving as a raw material of the positive electrode active material should be appropriate. To this end, it is preferred to set the pH of an aqueous solution containing a salt of the transition metal to 9.5 to 12.5, the stirring time to 5 to 40 hours, and the reaction temperature to 25 to 60° C. in the production of the transition metal hydroxide by precipitation.

Moreover, in order to adjust $V_{Pr}=(1-C/D)/(A^2 \times B^3)$ to be in 0.0005 to 0.04, as described previously, before the synthesis (second baking) for producing the positive electrode active material, the transition metal hydroxide needs to be firstly baked at an appropriate temperature to convert it to an oxide. The baking temperature of the first baking is preferably 450 to 900° C. The baking time is not specifically limited as long as an oxide having a single crystal structure is obtained. Preferably, the baking time is not less than 5 hours. The baking atmosphere is not specifically limited as long as it is an oxidizing atmosphere. Preferred is an atmosphere of air or oxygen.

The baking temperature of the second baking is preferably 700 to 800° C. The baking time is not specifically limited as long as a composite oxide having a single crystal structure is obtained. Preferably, the baking time is not less than 5 hours. The baking atmosphere is not specifically limited as long as it is an oxidizing atmosphere. Preferred is an atmosphere of air or oxygen.

The reason why the synthesis conditions given above results in the value of $V_{Pr}$ within a desired range is not currently known and clarification is awaited. However, it can be safely stated that the above-described conditions are extremely effective in controlling the value of $V_{Pr}$ to be in 0.0005 to 0.04 with excellent reproducibility.

By adjusting the value of $V_{Pr}$ to be in a desired range, the amount of electrolyte in surface portion of the secondary particles of the positive electrode active material can be controlled to be in an appropriate range. Accordingly, when the battery at a low SOC is stored at a high temperature, the formation of a film due to decomposition of the non-aqueous electrolyte on the positive electrode active material can be prevented. As a result, the increase of internal resistance during high temperature storage can also be prevented. When the value of $V_{Pr}$ exceeds 0.04, the amount of electrolyte in surface portion will be excessively large, resulting in poor high temperature storage characteristic. In contrast, when the value of $V_{Pr}$ is less than 0.0005, the amount of electrolyte in surface portion becomes excessively small, reducing the ion conductivity of the active material and resulting in poor high input/output characteristic.

The amount of electrolyte in surface portion can be determined by energy-dispersive X-ray spectroscopy (EDS) using a transmission electron microscope (TEM). In the EDS analysis, the elements contained in a sample and the content thereof can be determined from the intensity of the X-ray generated upon the irradiation of an electron beam to the sample. When the non-aqueous electrolyte contains lithium hexafluorophosphate ($LiPF_6$) as a solute, for example, the concentration of an element P (hereinafter referred to as solute component P) in the $LiPF_6$ is determined. In this case, the concentration of the solute component P is preferably not less than 0.2 atom % and not greater than 1.5 atom %, more preferably not greater than 0.7 atom %.

The type of the transition metal-containing composite oxide of the positive electrode active material is not specifically limited. Any transition metal-containing composite oxide that has been used for lithium ion secondary batteries can be used such as lithium cobalt oxide, lithium nickel oxide and lithium manganese oxide. From the standpoint of producing a battery having excellent output characteristic and improved safety, preferred is a composite oxide represented by the formula: $Li_xNi_{1-(y+z)}Co_yM_zP_2$, where $0.95 \leq x \leq 1.05$, $0.1 \leq y \leq 0.35$ and $0.01 \leq z \leq 0.35$, and the element M is at least one selected from the group consisting of Al, Mn, Ti, Mg, Mo, Y, Zr and Ca. The above value of x is a value obtainable immediately after the synthesis of the active material, and it fluctuates during charge and discharge of the battery.

In the formula: $Li_xNi_{1-(y+z)}Co_yM_zO_2$, when the value of x is less than 0.95, the capacity of the positive electrode active material is small. Conversely, when the value of x exceeds 1.05, the amount of gas generated during high temperature storage may increase. When the value of y is less than 0.1, the battery capacity may decrease significantly after high temperature storage. Conversely, when the value of y exceeds 0.35, the capacity of the positive electrode active material may decrease. When the value of z is less than 0.01, the safety may be impaired. When the value of z exceeds 0.35, the capacity of the positive electrode active material may decrease. Accordingly, when $0.1 \leq y \leq 0.2$ and $0.02 \leq z \leq 0.1$ are satisfied, a battery having an excellent balance among storage characteristic, capacity and safety can be produced.

As the negative electrode active material, a carbon material capable of absorbing and desorbing lithium ions, a metal oxide such as tin oxide or silicon oxide, lithium metal, or a lithium alloy can be used. Among them, preferred is the carbon material. Examples of the carbon material include thermal decomposition products of various organic materials, artificial graphite and natural graphite. The artificial graphite is produced by, for example, heat-treating a graphitizable pitch obtained from various raw materials at a high temperature. The natural graphite should be purified for use. Graphite with a surface treated with pitch or the like may be used.

The graphite material preferably has the following physical properties.

The graphite material preferably has a spacing (d002) of 0.335 to 0.34 nm, and more preferably 0.335 to 0.337 nm, which is a spacing between (002) planes measured by Gakushin method using an X-ray diffractometer. The crystallite size (Lc) is preferably not less than 30 nm, more preferably not less than 50 nm, and particularly preferably not less than 100 nm. The ash content is preferably not greater than 1 wt %, more preferably not greater than 0.5 wt %, and particularly preferably not greater than 0.1 wt %. The median diameter determined by a laser diffraction scattering method is preferably 1 to 100 µm, more preferably 3 to 50 µm, particularly preferably 5 to 40 µm, and most preferably 7 to 30 µm. The specific surface area measured by BET method is preferably 0.5 to 25 $m^2/g$, more preferably 0.7 to 20 $m^2/g$, particularly preferably 1 to 15 $m^2/g$, and most preferably 1.5 to 10 $m^2/g$. In Raman spectrum analysis using an argon ion laser, the intensity ratio (R=IB/IA) of peak PB at 1350 to 1370 $cm^{-1}$ (peak intensity IB) to peak PA at 1580 to 1620 $cm^{-1}$ (peak intensity IA) is preferably 0 to 0.5. Preferably, the peak PA has a half width of not greater than 26 $cm^{-1}$, and the peak PB has a half width of not greater than 25 $cm^{-1}$.

The method for producing the positive or negative electrode is not specifically limited. For example, an active material mixture containing an active material, a binder and optional materials such as thickener and conductive material is mixed with a liquid component to prepare an electrode material mixture paste. The prepared paste is applied onto a current collector, followed by drying. Thereby, a sheet-like electrode plate can be produced. Alternatively, the electrode material mixture may be pressed into a pellet-shaped electrode. Each of the active material, the binder, the thickener, and the conductive material may be used singly or in any combination of two or more kinds.

The binder for the active material should be stable in the liquid component used in the production of electrodes or non-aqueous electrolyte. Examples of the binder include polyvinylidene fluoride, polytetrafluoroethylene, styrene butadiene rubber, isoprene rubber and butadiene rubber. Examples of the thickener include carboxymethyl cellulose, methyl cellulose, hydroxymethyl cellulose, ethyl cellulose, polyvinyl alcohol, starch oxide, phosphorus starch oxide and casein. Examples of the conductive material include carbon materials such as graphite and carbon black. As the conductive material for the negative electrode, copper or nickel can also be used.

The positive electrode current collector can be made of aluminum, an aluminum alloy, titanium, a titanium alloy, tantalum, etc. Among them, aluminum and the alloy thereof are preferred in terms of energy density because they are light-weight. The negative electrode current collector can be made of copper, a copper alloy, nickel, a nickel alloy, stainless steel, etc. Among them, copper is preferred because it is easily formed into a thin film and inexpensive.

The material of the separator for preventing physical contact between the positive and negative electrodes is not specifically limited. Preferred is a separator having a high ion permeability and a low electric resistance. As the material of the separator, a material should be selected which is stable against the non-aqueous electrolyte and has excellent electrolyte retention. For example, a microporous film or a nonwoven fabric that are made of polyolefin such as polyethylene or polypropylene can be used. The separator preferably has a thickness of 10 to 30 µm. When the thickness is less than 10 µm, the positive and negative electrodes easily come in contact with each other. Conversely, when the thickness exceeds 30 µm, the battery capacity decreases.

As the non-aqueous electrolyte, a non-aqueous solvent dissolving a lithium salt as a solute is used. The concentration of the lithium salt in the non-aqueous electrolyte is preferably 0.5 to 2 mol/L. When the concentration is less than 0.5 mol/L or exceeds 2 mol/L, the non-aqueous electrolyte has a low ion conductivity, which might degrade the battery performance.

Examples of the non-aqueous solvent include, but not limited to, cyclic carbonates such as ethylene carbonate, propylene carbonate and butylene carbonate; linear carbonates such as dimethyl carbonate, diethyl carbonate and ethyl methyl carbonate; cyclic esters such as γ-butyrolactone and γ-valerolactone; linear esters such as methyl acetate and methyl propionate; cyclic ethers such as tetrahydrofuran, 2-methyl tetrahydrofuran and tetrahydropyran; linear ethers such as dimethoxyethane and dimethoxymethane; sulfur-containing organic solvents such as sulfolane and diethyl sulfone. Preferably, they are used in any combination of two or more. Particularly preferred is a mixture of a cyclic carbonate and a linear carbonate. The mixture preferably accounts for not less than 90 wt % of the entire non-aqueous electrolyte. The cyclic carbonate is preferably ethylene carbonate, propylene carbonate or a mixture thereof. The linear carbonate is preferably at least one selected from the group consisting of dimethyl carbonate, diethyl carbonate and ethyl methyl carbonate.

Examples of the lithium salt include, but not limited to, $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$. They may be used singly or in any combination of two or more. Among them, particularly preferred is at least one selected from $LiPF_6$ and $LiBF_4$.

An electrode group can be produced by, for example, spirally winding the sheet-like positive and negative electrodes with the separator interposed therebetween so as to have a substantially circular or oval cross-section. The electrode group is then inserted into a cylindrical or prismatic battery case, to which the non-aqueous electrolyte is injected. Then, the opening of the battery case is sealed with a lid. Thereby, a cylindrical or prismatic non-aqueous electrolyte secondary battery is produced.

The present invention will be described below in detail with reference to FIG. 1. In the examples given below, cylindrical batteries are produced, but the shape of the battery is not limited thereto. The present invention is applicable to batteries of any shape such as coin type, button type, sheet type, laminate type, prismatic type or flat type.

EXAMPLE 1

Battery A (a) Production of Positive Electrode

A lithium nickel composite oxide represented by the formula: $Li_{1.01}Ni_{0.82}Co_{0.15}Al_{0.03}O_2$ was prepared in the following procedure.

A mixed aqueous solution having a nickel sulfate concentration of 0.164 mol/L, a cobalt sulfate concentration of 0.030 mol/L and an aluminum sulfate concentration of 0.003 mol/L was fed into a beaker. To the aqueous solution in the beaker was added dropwise 0.1 mol/L sodium hydroxide aqueous solution to proceed with a precipitation reaction. With constant stirring, the reaction was continued for 30 hours to precipitate a hydroxide, during which the pH of the aqueous solution in the beaker was adjusted to 10 and the temperature was kept at 30° C. The resulting precipitate was filtrated, washed with water and dried at 80° C. Thereby, $Ni_{0.82}Co_{0.15}Al_{0.03}(OH)_2$ (hydroxide A) having a tap density of 2.3 g/ml and an average particle size of about 10 μm was obtained.

The obtained $Ni_{0.82}Co_{0.15}Al_{0.03}(OH)_2$ was heat-treated in air at 600° C. for 10 hours for first baking. Thereby, nickel oxide, namely $Ni_{0.82}Co_{0.15}Al_{0.03}O_2$, was obtained. The obtained oxide was analyzed by powder X-ray diffractometry and found to have the same crystal structure as single-phase nickel oxide.

Subsequently, to the obtained $Ni_{0.82}Co_{0.15}Al_{0.03}O_2$ was added lithium hydroxide monohydrate such that the ratio between the total atomic number of Ni, Co and Al and the atomic number of Li was 1.00:1.01. The obtained mixture was then heat-treated in an oxygen atmosphere at 750° C. for 10 hours for second baking. Thereby, $Li_{1.01}Ni_{0.82}Co_{0.15}Al_{0.03}O_2$ was obtained. Powder X-ray diffractometry showed that the resulting lithium nickel composite oxide had a single-phase layered hexagonal crystal structure (true density D: 4.84 g/ml). It also showed that Co and Al were incorporated in the crystals of the lithium nickel composite oxide, forming a solid solution. The composite oxide was then pulverized and sized. Thereby, a positive electrode active material A was prepared.

The positive electrode active material A had an average particle size B of 9.5 μm, a tap density C of 2.5 g/ml, and a specific surface area of 0.3 m²/g which was determined by BET method. A cross-section of a cured resin containing the positive electrode active material A was polished and then analyzed by an electron microscope (hereinafter referred to as "cross-section analysis"). As a result, the positive electrode active material A was found to have an average primary particle size A of about 0.6 μm. It was also found that a plurality of primary particles were aggregated to form a nearly spherical or oval-shaped secondary particle. The average primary particle size A was determined using a top 10% largest subset data extracted from the entire diameter data of the primary particles measured in the cross-section analysis.

A positive electrode material mixture paste was then prepared by mixing 100 parts by weight of the positive electrode active material A obtained above with 11.5 parts by weight of acetylene black as a conductive material, and an N-methyl-2-pyrrolidone (NMP) solution dissolving polyvinylidene fluoride (PVDF) as a binder. The amount of the PVDF was 6 parts by weight relative to 100 parts by weight of the active material. Subsequently, the paste was applied onto both surfaces of an aluminum foil, which was then dried and rolled. Thereby, a positive electrode having an active material density of 1.90 g/ml, a thickness of 0.073 mm, a material mixture layer width of 37 mm, and a length of 370 mm was produced.

(b) Production of Negative Electrode

For the negative electrode active material, artificial graphite having an average particle size of about 10 μm, a spacing (d002) between (002) planes of 0.336 nm determined by powder X-ray diffractometry and a true density of 2.24 g/ml was used. To 100 parts by weight of the artificial graphite was added an NMP solution of PVDF such that the amount of the PVDF was 9 parts by weight, followed by mixing. Thereby, a negative electrode material mixture paste was obtained. The obtained paste was applied onto both surfaces of a copper foil, which was then dried and rolled. Thereby, a negative electrode having an active material density of 1.25 g/ml, a thickness of 0.077 mm, a material mixture layer width of 39 mm, and a length of 390 mm was produced.

(c) Preparation of Non-Aqueous Electrolyte

A non-aqueous electrolyte was prepared by dissolving lithium hexafluorophosphate ($LiPF_6$) in a solvent mixture of ethylene carbonate (EC), dimethyl carbonate (DMC) and ethyl methyl carbonate (EMC) at a volume ratio of 30:56:14 at a $LiPF_6$ concentration of 1 mol/L.

(d) Assembly of Battery

A cylindrical battery as shown in FIG. 1 was assembled in the following procedure.

A positive electrode lead 5a made of aluminum was connected to an exposed Al portion of a positive electrode 5 having no material mixture. Likewise, a negative electrode lead 6a made of nickel was connected to an exposed Cu portion of a negative electrode 6 having no material mixture. The positive electrode 5 and the negative electrode 6 were spirally wound with a separator 7 comprising a polypropylene (PP) layer and a polyethylene (PE) layer interposed therebetween to form an electrode group. On the top of the electrode group was placed an upper insulating plate 8a made of polypropylene. On the bottom was placed a lower insulating plate 8b made of polypropylene. Then, the electrode group was housed in a case 1 made of iron plated with nickel having a diameter of 12.3 mm and a height of 50 mm. The non-aqueous electrolyte was injected into the case 1, after which the opening of the case 1 was sealed using a sealing plate 2 equipped with a gasket 3 therearound. Thereby, a battery A having a theoretical capacity of 200 mAh was produced.

Battery B

Hydroxide B was prepared in the same manner as the hydroxide A was prepared, except that, during the preparation of $Ni_{0.82}Co_{0.15}Al_{0.03}(OH)_2$, the pH of the aqueous solution in the beaker was changed to 12, and the reaction temperature and the stirring time were changed to 50° C. and 5 hours, respectively. The hydroxide B thus obtained had a tap density of 1.8 g/ml and an average particle size of about 5 μm.

Then, a positive electrode active material B having an average particle size of 5.0 μm was prepared in the same manner as the positive electrode active material A was prepared, except that the hydroxide B was used, and the first baking temperature was changed to 300° C. The positive electrode active material B thus obtained had a true density of 4.84 g/ml, a tap density of 2.2 g/ml and an average primary particle size of 0.1 μm.

Subsequently, a battery B was produced in the same manner as the battery A was produced except that the positive electrode active material B was used.

Battery C

A positive electrode active material C having an average particle size of 5.0 μm was prepared in the same manner as the positive electrode active material B was prepared, except that the first baking temperature of the hydroxide B was changed to 600° C. and the second baking temperature was changed to 800° C. The positive electrode active material C thus obtained had a true density of 4.84 g/ml, a tap density of 2.2 g/ml and an average primary particle size of 0.3 μm.

Subsequently, a battery C was produced in the same manner as the battery A was produced except that the positive electrode active material C was used.

Battery D

A positive electrode active material D having an average particle size of 5.0 μm was prepared in the same manner as the positive electrode active material C was prepared, except that the first baking temperature of the hydroxide B was changed to 900° C. The positive electrode active material D thus obtained had a true density of 4.84 g/ml, a tap density of 2.3 g/ml and an average primary particle size of 0.5 μm.

Subsequently, a battery D was produced in the same manner as the battery A was produced except that the positive electrode active material D was used.

Battery E

Hydroxide C was prepared in the same manner as the hydroxide A was prepared, except that, during the preparation of $Ni_{0.82}Co_{0.15}Al_{0.03}(OH)_2$, the reaction temperature was changed to 40° C. The hydroxide C thus prepared had a tap density of 2.2 g/ml and an average particle size of about 7 μm.

Then, a positive electrode active material E having an average particle size of 7.0 μm was prepared in the same manner as the positive electrode active material A was prepared, except that the hydroxide C was used, and the first baking temperature was changed to 450° C. The positive electrode active material E thus obtained had a true density of 4.84 g/ml, a tap density of 2.3 g/ml and an average primary particle size of 0.2 μm.

Subsequently, a battery E was produced in the same manner as the battery A was produced except that the positive electrode active material E was used.

Battery F

A positive electrode active material F having an average particle size of 7.0 μm was prepared in the same manner as the positive electrode active material E was prepared, except that the first baking temperature of the hydroxide C was changed to 600° C. The positive electrode active material F thus obtained had a true density of 4.84 g/ml, a tap density of 2.4 g/ml and an average primary particle size of 0.3 μm.

Subsequently, a battery F was produced in the same manner as the battery A was produced except that the positive electrode active material F was used.

Battery G

A positive electrode active material G having an average particle size of 10.0 μm was prepared in the same manner as the positive electrode active material A was prepared, except that the first baking temperature of the hydroxide A was changed to 300° C. The positive electrode active material G thus obtained had a true density of 4.84 g/ml, a tap density of 2.4 g/ml and an average primary particle size of 0.1 μm.

Subsequently, a battery G was produced in the same manner as the battery A was produced except that the positive electrode active material G was used.

Battery H

A positive electrode active material H having an average particle size of 9.0 μm was prepared in the same manner as the positive electrode active material A was prepared, except that the first baking temperature of the hydroxide A was changed to 900° C. and the second baking temperature was changed to 800° C. The positive electrode active material H thus obtained had a true density of 4.84 g/ml, a tap density of 2.5 g/ml and an average primary particle size of 1.0 μm.

Subsequently, a battery H was produced in the same manner as the battery A was produced except that the positive electrode active material H was used.

Battery I

Hydroxide D was prepared in the same manner as the hydroxide A was prepared, except that, during the preparation of $Ni_{0.82}Co_{0.15}Al_{0.03}(OH)_2$, the reaction temperature was changed to 25° C. The hydroxide D thus prepared had a tap density of 2.4 g/ml and an average particle size of about 12.0 µm.

Then, a positive electrode active material I having an average particle size of 12.0 µm was prepared in the same manner as the positive electrode active material A was prepared, except that the hydroxide D was used. The positive electrode active material I thus obtained had a true density of 4.84 g/ml, a tap density of 2.6 g/ml and an average primary particle size of 0.7 µm.

Subsequently, a battery I was produced in the same manner as the battery A was produced except that the positive electrode active material I was used.

Battery J

Hydroxide E was prepared in the same manner as the hydroxide A was prepared, except that, during the preparation of $Ni_{0.82}Co_{0.15}Al_{0.03}(OH)_2$, the pH of the aqueous solution in the beaker was changed to 9, and the reaction temperature and the stirring time were changed to 25° C. and 50 hours, respectively. The hydroxide E thus prepared had a tap density of 2.6 g/ml and an average particle size of about 13.0 µm.

Then, a positive electrode active material J having an average particle size of 13.0 µm was prepared in the same manner as the positive electrode active material A was prepared, except that the hydroxide E was used, and the second baking temperature was changed to 700° C. The positive electrode active material J thus obtained had a true density of 4.84 g/ml, a tap density of 2.8 g/ml and an average primary particle size of 1.0 µm.

Subsequently, a battery J was produced in the same manner as the battery A was produced except that the positive electrode active material J was used.

Battery K

A positive electrode active material K having an average particle size of 12.0 µm was prepared in the same manner as the positive electrode active material J was prepared, except that the first baking temperature of the hydroxide E was changed to 900° C. and the second baking temperature was changed to 800° C. The positive electrode active material K thus obtained had a true density of 4.84 g/ml, a tap density of 2.8 g/ml and an average primary particle size of 1.2 µm.

Subsequently, a battery K was produced in the same manner as the battery A was produced except that the positive electrode active material K was used.

Table 1 given below shows the tap density and the production conditions for the hydroxides. Table 2 shows the baking conditions used to produce oxides, as well as the average particle size B, the tap density C and the average primary particle size A for the positive electrode active materials.

TABLE 1

|  | Tap density of hydroxide (g/ml) | pH | Reaction temperature (° C.) | Stirring time (hr) |
| --- | --- | --- | --- | --- |
| Hydroxide A | 2.3 | 10 | 30 | 30 |
| Hydroxide B | 1.8 | 12 | 50 | 5 |
| Hydroxide C | 2.2 | 10 | 40 | 30 |
| Hydroxide D | 2.4 | 10 | 25 | 30 |
| Hydroxide E | 2.6 | 9 | 25 | 50 |

TABLE 2

| Active material | Hydroxide | Temperature (° C.) | | Tap density (g/ml) | Average primary particle size (µm) | Average particle size (µm) |
| --- | --- | --- | --- | --- | --- | --- |
| | | First baking | Second baking | | | |
| A | Hydroxide A | 600 | 750 | 2.5 | 0.6 | 9.5 |
| B | Hydroxide B | 300 | 750 | 2.2 | 0.1 | 5.0 |
| C | Hydroxide B | 600 | 800 | 2.2 | 0.3 | 5.0 |
| D | Hydroxide B | 900 | 800 | 2.3 | 0.5 | 5.0 |
| E | Hydroxide C | 450 | 750 | 2.3 | 0.2 | 7.0 |
| F | Hydroxide C | 600 | 750 | 2.4 | 0.3 | 7.0 |
| G | Hydroxide A | 300 | 750 | 2.4 | 0.1 | 10.0 |
| H | Hydroxide A | 900 | 800 | 2.5 | 1.0 | 9.0 |
| I | Hydroxide D | 600 | 750 | 2.6 | 0.7 | 12.0 |
| J | Hydroxide E | 600 | 700 | 2.8 | 1.0 | 13.0 |
| K | Hydroxide E | 900 | 800 | 2.8 | 1.2 | 12.0 |

[Evaluation Tests]

Prior to the evaluation tests, each of the batteries A to K was subjected to pre-charge/discharge. Specifically, each battery was cycled three times. In the cycles, the battery was charged at a current of 40 mA (equivalent to 5 hour rate) to 4.1 V and then discharged at a current of 40 mA to 3.0 V. Subsequently, the battery was charged at a current of 40 mA to 4.1 V, which was then allowed to stand at 45° C. for 7 days. Thereby, test batteries were prepared.

(Current-Voltage Characteristic)

Each test battery was charged at a constant current in an environment of 25° C. until the battery had a state of charge (SOC) of 60%. In the case of compact batteries for consumer use, the end-of-charge voltage is usually set to 4.2 V, but the end-of-charge voltage used here was set to 4.1 V. In other words, a battery charged to a voltage of 4.1 V was regarded to have an SOC of 100%.

Figure 3:
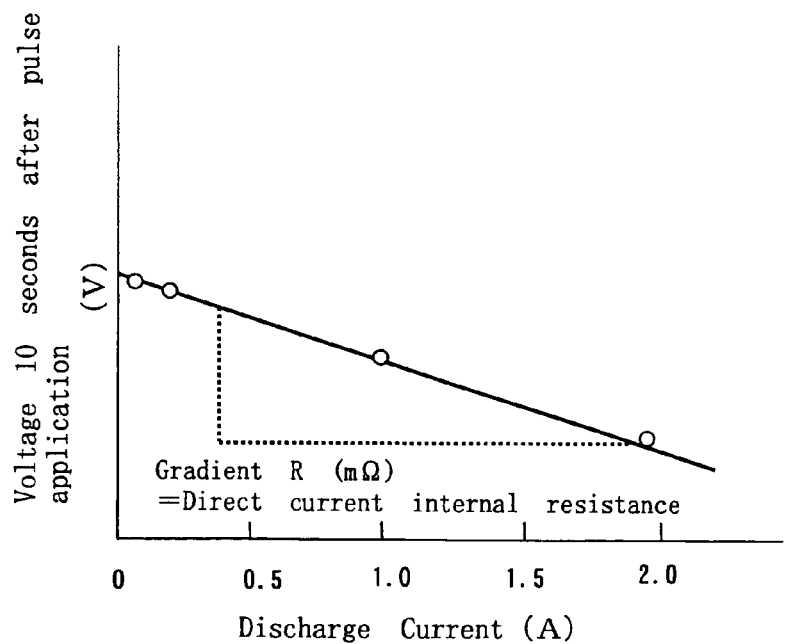
FIG. 3 is a graph illustrating a method for calculating a direct-current internal resistance of a battery.

Subsequently, discharge pulse and charge pulse as shown in FIG. 2 were repeatedly applied to the battery. A voltage was measured 10 seconds after the application of each pulse. The measured voltage values were plotted against current values. Least-square method was then applied to the plots of discharge side to determine an approximate line as shown in FIG. 3. A direct current internal resistance was determined from the gradient of the approximate line. The results are shown in Table 3.

(Storage Characteristic)

After the current-voltage characteristic test, each battery was again charged until the battery had a state of charge (SOC) of 60%, which was then stored at 60° C. for 20 days. Subsequently, the battery was again subjected to the current-voltage characteristic test described above. Then, an increase rate of direct current internal resistance after storage was determined relative to that of before storage. The results are shown in Table 3.

(Amount of Electrolyte in Surface Portion)

The amount of electrolyte in surface portion of the positive electrode active material contained in each of the test batteries (before the storage at 60° C.) was determined. Specifically, each battery was discharged at a current of 40 mA to 3.0 V, after which the battery was disassembled, and the positive electrode material mixture was partially removed therefrom. The positive electrode material mixture sample thus obtained was attached onto a Si substrate with an adhesive. A focused ion beam process (FIB process) was performed using an FIB system (namely, FB-2000A available from Hitachi, Ltd.) so as to make the sample thin enough to be observed by a transmission electron microscope (TEM). The outermost surface of the processed sample was coated with a Pt—Pd film, a Pt film and a W film for protection.

The FIB-processed sample was then analyzed by energy dispersive spectrometry (EDS) using JEM-4000EX available from JEOL Ltd. and HF-2200 available from Hitachi, Ltd. In short, elemental analysis was performed with respect to element P forming the solute of the non-aqueous electrolyte (solute component P). Points P1, P2 and P3 in a secondary particle 40 shown in FIG. 4 were analyzed. The point P1 corresponded to a space between the primary particles 42a in the outermost layer. The point P2 corresponded to a space between the primary particles 42b in the second layer adjacent to the outermost layer. The point P3 corresponded to a space between the primary particle 42a in the outermost layer and the primary particle 42b in the second layer. The concentration of the solute component P in each of the points was determined. The results are shown in Table 3.

The void volume $V_{Pr}$ calculated by the equation: $V_{Pr}=(1-C/D)/(A^2 \times B^3)$, where A is an average particle size of the primary particles (μm), B is an average particle size of the positive electrode active material (μm), C is a tap density of the positive electrode active material (g/ml), and D is a true density of the positive electrode active material (g/ml), is also shown in Table 3.

TABLE 3

| Battery | $V_{Pr}$ | Direct current internal resistance | | Concentration of solute component P (atom %) | | |
|---|---|---|---|---|---|---|
| | | Initial resistance (mΩ) | Increase rate after storage (%) | Point P1 | Point P2 | Point P3 |
| A | 0.00157 | 106 | 5 | 0.6 | 0 | 0 |
| B | 0.43636 | 101 | 24 | 3.3 | 2.0 | 2.3 |
| C | 0.04848 | 102 | 21 | 2.1 | 0.7 | 1.0 |
| D | 0.01679 | 103 | 7 | 1.3 | 0 | 0.4 |
| E | 0.03825 | 102 | 12 | 1.5 | 0 | 0.6 |
| F | 0.01633 | 103 | 6 | 0.6 | 0 | 0.2 |
| G | 0.05041 | 102 | 21 | 2.3 | 0.7 | 1.1 |
| H | 0.00066 | 108 | 5 | 0.4 | 0 | 0.1 |
| I | 0.00055 | 110 | 5 | 0.4 | 0 | 0 |
| J | 0.00019 | 116 | 4 | 0.2 | 0 | 0 |
| K | 0.00017 | 117 | 5 | 0.2 | 0 | 0 |

As is clear from the results of Table 3, the batteries B and C, which contained the hydroxide B having a low tap density prepared with the reduced stirring time (residence time) of the aqueous solution, exhibited a $V_{Pr}$ value of over 0.04. This means that the amount of electrolyte in surface portion was large. Accordingly, the increase rate of direct current internal resistance after storage was very high. This indicates that the use of a positive electrode active material in which the void volume between the primary particles is large results in an excessively large amount of electrolyte in surface portion, which degrades the storage characteristic of the battery having a low SOC.

The battery G, which contained the positive electrode active material having a small primary particle size prepared with the reduced first baking temperature, also exhibited a $V_{pr}$ value of over 0.04. Accordingly, evaluation results similar to those of the batteries B and C were obtained. This indicates that the use of a positive electrode active material in which the surface area of the primary particles is large also results in an excessively large amount of electrolyte in surface portion, which degrades the storage characteristic of the battery having a low SOC.

In contrast, the batteries J and K, which contained the hydroxide E having a high tap density prepared with the increased stirring time of the aqueous solution, exhibited a value of less than 0.0005. This means that the amount of electrolyte in surface portion was small. Accordingly, the direct current internal resistance before storage was high. This indicates that the use of a positive electrode active material in which the void volume between the primary particles is small results in an excessively small amount of electrolyte in surface portion. As a consequence, the high input/output characteristic is degraded along with the deterioration of ion conductivity.

The foregoing illustrates that the value of $V_{Pr}$ should be set to 0.0005 to 0.04 in order to produce a battery having both excellent high input/output characteristic and storage characteristic.

EXAMPLE 2

Battery L-1

A positive electrode active material L-1 represented by the formula: $Li_{0.93}Ni_{0.82}Co_{0.15}Al_{0.03}O_2$ having an average particle size of 8.0 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:0.93. The positive electrode active material L-1 thus obtained had a true density of 4.80 g/ml, a tap density of 2.1 g/ml and an average primary particle size of 0.3 μm.

Subsequently, a battery L-1 was produced in the same manner as the battery A was produced except that the positive electrode active material L-1 was used.

Battery L-2

A positive electrode active material L-2 represented by the formula: $Li_{0.95}Ni_{0.82}Co_{0.15}Al_{0.03}O_2$ having an average particle size of 8.5 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:0.95. The positive electrode active material L-2 thus obtained had a true density of 4.81 g/ml, a tap density of 2.3 g/ml and an average primary particle size of 0.4 μm.

Subsequently, a battery L-2 was produced in the same manner as the battery A was produced except that the positive electrode active material L-2 was used.

Battery L-3

A positive electrode active material L-3 represented by the formula: $Li_{0.98}Ni_{0.82}Co_{0.15}Al_{0.03}O_2$ having an average particle size of 8.5 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:0.98. The positive electrode active material L-3 thus obtained had a true density of 4.82 g/ml, a tap density of 2.3 g/ml and an average primary particle size of 0.4 μm.

Subsequently, a battery L-3 was produced in the same manner as the battery A was produced except that the positive electrode active material L-3 was used.

Battery M

A positive electrode active material M represented by the formula: $Li_{1.00}Ni_{0.82}Co_{0.15}Al_{0.03}O_2$ having an average particle size of 8.5 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:1.00. The positive electrode active material M thus obtained had a true density of 4.83 g/ml, a tap density of 2.4 g/ml and an average primary particle size of 0.5 μm.

Subsequently, a battery M was produced in the same manner as the battery A was produced except that the positive electrode active material M was used.

Battery N

A positive electrode active material N represented by the formula: $Li_{1.03}Ni_{0.82}Co_{0.15}Al_{0.03}O_2$ having an average particle size of 9.0 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:1.03. The positive electrode active material N thus obtained had a true density of 4.85 g/ml, a tap density of 2.6 g/ml and an average primary particle size of 0.7 μm.

Subsequently, a battery N was produced in the same manner as the battery A was produced except that the positive electrode active material N was used.

Battery O-1

A positive electrode active material O-1 represented by the formula: $Li_{1.05}Ni_{0.82}Co_{0.15}Al_{0.03}O_2$ having an average particle size of 9.0 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:1.05. The positive electrode active material O-1 thus obtained had a true density of 4.85 g/ml, a tap density of 2.6 g/ml and an average primary particle size of 0.7 μm.

Subsequently, a battery O-1 was produced in the same manner as the battery A was produced except that the positive electrode active material O-1 was used.

Battery O-2

A positive electrode active material O-2 represented by the formula: $Li_{1.07}Ni_{0.82}Co_{0.15}Al_{0.03}O_2$ having an average particle size of 9.5 μm was produced in the same manner as the positive electrode active material A was prepared except that, in the preparation of the lithium nickel composite oxide, lithium hydroxide monohydrate was added to the hydroxide A after the first baking such that the ratio between the total atomic number of Ni, Co and Al and the atomic number of Li was 1.00:1.07. The positive electrode active material O-2 thus obtained had a true density of 4.85 g/ml, a tap density of 2.6 g/ml and an average primary particle size of 0.8 μm.

Subsequently, a battery O-2 was produced in the same manner as the battery A was produced except that the positive electrode active material O-2 was used.

Battery P

A positive electrode active material P represented by the formula: $Li_{1.01}Ni_{0.89}Co_{0.08}Al_{0.03}O_2$ having an average particle size of 12.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.89}Co_{0.08}Al_{0.03}(OH)_2$ and the obtained hydroxide was used. The positive electrode active material P thus obtained had a true density of 4.82 g/ml, a tap density of 2.4 g/ml and an average primary particle size of 0.4 μm.

Subsequently, a battery P was produced in the same manner as the battery A was produced except that the positive electrode active material P was used.

Battery Q

A positive electrode active material Q represented by the formula: $Li_{1.01}Ni_{0.87}Co_{0.10}Al_{0.03}O_2$ having an average particle size of 12.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.87}Co_{0.10}Al_{0.03}(OH)_2$ and the obtained hydroxide was used. The positive electrode active material Q thus obtained had a true density of 4.83 g/ml, a tap density of 2.4 g/ml and an average primary particle size of 0.5 μm.

Subsequently, a battery Q was produced in the same manner as the battery A was produced except that the positive electrode active material Q was used.

Battery R

A positive electrode active material R represented by the formula: $Li_{1.01}Ni_{0.62}Co_{0.35}Al_{0.03}O_2$ having an average particle size of 9.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.62}Co_{0.35}Al_{0.03}(OH)_2$ and the obtained hydroxide was used. The positive electrode active material R thus obtained had a true density of 4.87 g/ml, a tap density of 2.6 g/ml and an average primary particle size of 0.6 μm.

Subsequently, a battery R was produced in the same manner as the battery A was produced except that the positive electrode active material R was used.

Battery S

A positive electrode active material S represented by the formula: $Li_{1.01}Ni_{0.57}Co_{0.40}Al_{0.03}O_2$ having an average particle size of 9.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.57}Co_{0.40}Al_{0.03}(OH)_2$ and the obtained hydroxide was used. The positive electrode active material S thus obtained had a true density of 4.89 g/ml, a tap density of 2.6 g/ml and an average primary particle size of 0.7 μm.

Subsequently, a battery S was produced in the same manner as the battery A was produced except that the positive electrode active material S was used.

Battery T

A positive electrode active material T represented by the formula: $Li_{1.01}Ni_{0.85}Co_{0.15}O_2$ having an average particle size of 8.0 μm was produced in the same manner as the positive electrode active material A was prepared except that, in the preparation of the lithium nickel composite oxide, a hydroxide represented by $Ni_{0.85}Co_{0.15}(OH)_2$ was prepared without the addition of aluminum sulfate to the aqueous solution held in the beaker and the obtained hydroxide was used. The positive electrode active material T thus obtained had a true density of 4.87 g/ml, a tap density of 2.5 g/ml and an average primary particle size of 0.4 μm.

Subsequently, a battery T was produced in the same manner as the battery A was produced except that the positive electrode active material T was used.

Battery U

A positive electrode active material U represented by the formula: $Li_{1.01}Ni_{0.84}Co_{0.15}Al_{0.01}O_2$ having an average particle size of 8.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.84}Co_{0.15}Al_{0.01}(OH)_2$ and the obtained hydroxide was used. The positive electrode active material U thus obtained had a true density of 4.85 g/ml, a tap density of 2.5 g/ml and an average primary particle size of 0.4 μm.

Subsequently, a battery U was produced in the same manner as the battery A was produced except that the positive electrode active material U was used.

Battery V

A positive electrode active material V represented by the formula: $Li_{1.01}Ni_{0.50}Co_{0.15}Al_{0.35}O_2$ having an average particle size of 10.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.50}Co_{0.15}Al_{0.35}(OH)_2$ and the obtained hydroxide was used. The positive electrode active material V thus obtained had a true density of 4.87 g/ml, a tap density of 2.3 g/ml and an average primary particle size of 0.8 μm.

Subsequently, a battery V was produced in the same manner as the battery A was produced except that the positive electrode active material V was used.

Battery W

A positive electrode active material W represented by the formula: $Li_{1.01}Ni_{0.45}Co_{0.15}Al_{0.40}O_2$ having an average particle size of 10.0 μm was produced in the same manner as the positive electrode active material A was prepared except that, in the preparation of the lithium nickel composite oxide, the concentrations of nickel sulfate, cobalt sulfate and aluminum sulfate in the aqueous solution held in the beaker were changed as appropriate to prepare a hydroxide represented by $Ni_{0.45}Co_{0.15}Al_{0.40}(OH)_2$ and the obtained hydroxide was used. The positive electrode active material W thus obtained had a true density of 4.43 g/ml, a tap density of 2.2 g/ml and an average primary particle size of 0.6 μm.

Subsequently, a battery W was produced in the same manner as the battery A was produced except that the positive electrode active material W was used.

Battery X

A positive electrode active material X represented by the formula: $Li_{1.01}Ni_{0.34}Co_{0.33}Mn_{0.33}O_2$ having an average particle size of 9.5 μm was produced in the same manner as the positive electrode active material A was prepared except that, in the preparation of the lithium nickel composite oxide, manganese sulfate was used instead of aluminum sulfate, the concentrations of nickel sulfate, cobalt sulfate and manganese sulfate in the aqueous solution held in the beaker were changed as appropriate to prepare a hydroxide represented by $Ni_{0.34}Co_{0.33}Mn_{0.33}(OH)_2$ and the obtained hydroxide was used. The positive electrode active material X thus obtained had a true density of 4.82 g/ml, a tap density of 2.5 g/ml and an average primary particle size of 0.6 μm.

Subsequently, a battery X was produced in the same manner as the battery A was produced except that the positive electrode active material X was used.

Battery Y-1

A positive electrode active material Y-1 represented by the formula: $Li_{1.01}Ni_{0.82}Co_{0.15}Ti_{0.03}O_2$ having an average particle size of 10.0 μm was produced in the same manner as the positive electrode active material A was prepared except that, in the preparation of the lithium nickel composite oxide, titanium nitrate was used instead of aluminum sulfate to prepare a hydroxide represented by $Ni_{0.82}Co_{0.15}Ti_{0.03}(OH)_2$ and the obtained hydroxide was used. The positive electrode active material Y-1 thus obtained had a true density of 4.84 g/ml, a tap density of 2.4 g/ml and an average primary particle size of 0.6 μm.

Subsequently, a battery Y-1 was produced in the same manner as the battery A was produced except that the positive electrode active material Y-1 was used.

Battery Y-2

A positive electrode active material Y-2 represented by the formula: $Li_{1.01}Ni_{0.82}Co_{0.15}Mg_{0.03}O_2$ having an average particle size of 10.5 μm was produced in the same manner as the positive electrode active material A was prepared except that, in the preparation of the lithium nickel composite oxide, magnesium sulfate was used instead of aluminum sulfate to prepare a hydroxide represented by $Ni_{0.82}Co_{0.15}Mg_{0.03}(OH)_2$ and the obtained hydroxide was used. The positive electrode active material Y-2 thus obtained had a true density of 4.84 g/ml, a tap density of 2.4 g/ml and an average primary particle size of 0.7 μm.

Subsequently, a battery Y-2 was produced in the same manner as the battery A was produced except that the positive electrode active material Y-2 was used.

Battery Y-3

A positive electrode active material Y-3 represented by the formula: $Li_{1.01}Ni_{0.82}Co_{0.15}Mo_{0.03}O_2$ having an average particle size of 9.5 μm was produced in the same manner as the positive electrode active material A was prepared except that, in the preparation of the lithium nickel composite oxide, molybdenum sulfate was used instead of aluminum sulfate to prepare a hydroxide represented by $Ni_{0.82}Co_{0.15}Mo_{0.03}(OH)_2$ and the obtained hydroxide was used. The positive electrode active material Y-3 thus obtained had a true density of 4.85 g/ml, a tap density of 2.5 g/ml and an average primary particle size of 0.5 μm.

Subsequently, a battery Y-3 was produced in the same manner as the battery A was produced except that the positive electrode active material Y-3 was used.

Battery Y-4

A positive electrode active material Y-4 represented by the formula: $Li_{1.01}Ni_{0.82}Co_{0.15}Y_{0.03}O_2$ having an average particle size of 10.0 μm was produced in the same manner as the positive electrode active material A was prepared except that, in the preparation of the lithium nickel composite oxide, yttrium sulfate was used instead of aluminum sulfate to prepare a hydroxide represented by $Ni_{0.82}Co_{0.15}Y_{0.03}(OH)_2$ and the obtained hydroxide was used. The positive electrode active material Y-4 thus obtained had a true density of 4.85 g/ml, a tap density of 2.6 g/ml and an average primary particle size of 0.7 μm.

Subsequently, a battery Y-4 was produced in the same manner as the battery A was produced except that the positive electrode active material Y-4 was used.

Battery Y-5

A positive electrode active material Y-5 represented by the formula: $Li_{1.01}Ni_{0.82}Co_{0.15}Zr_{0.03}O_2$ having an average particle size of 11.5 μm was produced in the same manner as the positive electrode active material A was prepared except that, in the preparation of the lithium nickel composite oxide, zirconium sulfate was used instead of aluminum sulfate to prepare a hydroxide represented by $Ni_{0.82}Co_{0.15}Zr_{0.03}(OH)_2$ and the obtained hydroxide was used. The positive electrode active material Y-5 thus obtained had a true density of 4.85 g/ml, a tap density of 2.5 g/ml and an average primary particle size of 0.7 μm.

Subsequently, a battery Y-5 was produced in the same manner as the battery A was produced except that the positive electrode active material Y-5 was used.

Battery Y-6

A positive electrode active material Y-6 represented by the formula: $Li_{1.01}Ni_{0.82}Co_{0.15}Ca_{0.03}O_2$ having an average particle size of 11.0 μm was produced in the same manner as the positive electrode active material A was prepared except that, in the preparation of the lithium nickel composite oxide, calcium hydroxide was used instead of aluminum sulfate to prepare a hydroxide represented by $Ni_{0.82}Co_{0.15}Ca_{0.03}(OH)_2$ and the obtained hydroxide was used. The positive electrode active material Y-6 thus obtained had a true density of 4.83 g/ml, a tap density of 2.4 g/ml and an average primary particle size of 0.6 μm.

Subsequently, a battery Y-6 was produced in the same manner as the battery A was produced except that the positive electrode active material Y-6 was used.

Table 4 shows the composition, average particle size B, tap density C and average primary particle size A of the positive electrode active materials prepared above.

TABLE 4

| Battery | Positive electrode active material | Tap density (g/ml) | Average primary particle size (μm) | Average particle size of active material (μm) |
|---|---|---|---|---|
| A | $Li_{1.01}Ni_{0.82}Co_{0.15}Al_{0.03}O_2$ | 2.5 | 0.6 | 9.5 |
| L-1 | $Li_{0.93}Ni_{0.82}Co_{0.15}Al_{0.03}O_2$ | 2.1 | 0.3 | 8.0 |
| L-2 | $Li_{0.95}Ni_{0.82}Co_{0.15}Al_{0.03}O_2$ | 2.3 | 0.4 | 8.5 |
| L-3 | $Li_{0.98}Ni_{0.82}Co_{0.15}Al_{0.03}O_2$ | 2.3 | 0.4 | 8.5 |
| M | $Li_{1.00}Ni_{0.82}Co_{0.15}Al_{0.03}O_2$ | 2.4 | 0.5 | 8.5 |
| N | $Li_{1.03}Ni_{0.82}Co_{0.15}Al_{0.03}O_2$ | 2.6 | 0.7 | 9.0 |
| O-1 | $Li_{1.05}Ni_{0.82}Co_{0.15}Al_{0.03}O_2$ | 2.6 | 0.7 | 9.0 |
| O-2 | $Li_{1.07}Ni_{0.82}Co_{0.15}Al_{0.03}O_2$ | 2.6 | 0.8 | 9.5 |
| P | $Li_{1.01}Ni_{0.89}Co_{0.08}Al_{0.03}O_2$ | 2.4 | 0.4 | 12.0 |
| Q | $Li_{1.01}Ni_{0.87}Co_{0.10}Al_{0.03}O_2$ | 2.4 | 0.5 | 12.0 |
| R | $Li_{1.01}Ni_{0.62}Co_{0.35}Al_{0.03}O_2$ | 2.6 | 0.6 | 9.0 |
| S | $Li_{1.01}Ni_{0.57}Co_{0.40}Al_{0.03}O_2$ | 2.6 | 0.7 | 9.0 |
| T | $Li_{1.01}Ni_{0.85}Co_{0.15}O_2$ | 2.5 | 0.4 | 8.0 |
| U | $Li_{1.01}Ni_{0.84}Co_{0.15}Al_{0.01}O_2$ | 2.5 | 0.4 | 8.0 |
| V | $Li_{1.01}Ni_{0.50}Co_{0.15}Al_{0.35}O_2$ | 2.3 | 0.8 | 10.0 |
| W | $Li_{1.01}Ni_{0.45}Co_{0.15}Al_{0.40}O_2$ | 2.2 | 0.6 | 10.0 |
| X | $Li_{1.01}Ni_{0.34}Co_{0.33}Mn_{0.33}O_2$ | 2.5 | 0.6 | 9.5 |
| Y-1 | $Li_{1.01}Ni_{0.82}Co_{0.15}Ti_{0.03}O_2$ | 2.4 | 0.6 | 10.0 |
| Y-2 | $Li_{1.01}Ni_{0.82}Co_{0.15}Mg_{0.03}O_2$ | 2.4 | 0.7 | 10.5 |
| Y-3 | $Li_{1.01}Ni_{0.82}Co_{0.15}Mo_{0.03}O_2$ | 2.5 | 0.5 | 9.5 |
| Y-4 | $Li_{1.01}Ni_{0.82}Co_{0.15}Y_{0.03}O_2$ | 2.6 | 0.7 | 10.0 |
| Y-5 | $Li_{1.01}Ni_{0.82}Co_{0.15}Zr_{0.03}O_2$ | 2.5 | 0.7 | 11.5 |
| Y-6 | $Li_{1.01}Ni_{0.82}Co_{0.15}Ca_{0.03}O_2$ | 2.4 | 0.6 | 11.0 |

[Evaluation Tests]

Prior to the evaluation tests, each of the batteries was subjected to the same pre-charge/discharge as described in EXAMPLE 1. Each battery was then allowed to stand at 45° C. for 7 days. Thereby, test batteries were prepared. Further, each battery was evaluated in terms of current-voltage characteristic and storage characteristic in the same manner as in EXAMPLE 1 to determine the direct current internal resistances before and after the storage at 60° C. The results are shown in Table 5. The amount of electrolyte in surface portion of the positive electrode active material contained in each battery was also determined, which is also shown in Table 5.

TABLE 5

| Battery | $V_{Pr}$ | Direct current internal resistance | | Concentration of solute component P (atom %) | | |
|---|---|---|---|---|---|---|
| | | Initial resistance (mΩ) | Increase rate after storage (%) | Point P1 | Point P2 | Point P3 |
| A | 0.00157 | 106 | 5 | 0.6 | 0 | 0 |
| L-1 | 0.01221 | 116 | 10 | 0.8 | 0 | 0.1 |
| L-2 | 0.00531 | 112 | 8 | 0.7 | 0 | 0 |
| L-3 | 0.00532 | 110 | 8 | 0.7 | 0 | 0.1 |
| M | 0.00328 | 108 | 8 | 0.6 | 0 | 0.1 |
| N | 0.00130 | 102 | 6 | 0.5 | 0 | 0 |
| O-1 | 0.00130 | 102 | 5 | 0.4 | 0 | 0.1 |
| O-2 | 0.00085 | 102 | 5 | 0.3 | 0 | 0.1 |
| P | 0.00182 | 102 | 5 | 0.4 | 0 | 0 |
| Q | 0.00116 | 102 | 4 | 0.4 | 0 | 0 |
| R | 0.00178 | 109 | 5 | 0.4 | 0 | 0 |
| S | 0.00131 | 109 | 6 | 0.4 | 0 | 0 |
| T | 0.00594 | 101 | 8 | 0.8 | 0 | 0.2 |
| U | 0.00591 | 101 | 8 | 0.7 | 0 | 0.2 |
| V | 0.00076 | 110 | 3 | 0.3 | 0 | 0 |
| W | 0.00140 | 111 | 6 | 0.5 | 0 | 0.1 |
| X | 0.00156 | 107 | 5 | 0.4 | 0 | 0.1 |
| Y-1 | 0.00140 | 106 | 6 | 0.5 | 0 | 0 |
| Y-2 | 0.00089 | 109 | 4 | 0.4 | 0 | 0 |
| Y-3 | 0.00226 | 104 | 7 | 0.5 | 0 | 0.1 |
| Y-4 | 0.00095 | 108 | 5 | 0.4 | 0 | 0 |
| Y-5 | 0.00065 | 109 | 4 | 0.4 | 0 | 0 |
| Y-6 | 0.00105 | 105 | 6 | 0.4 | 0 | 0 |

(Initial Capacity)

Each of the test batteries was cycled twice under the same conditions as the pre-charge/discharge. The discharge capacity at the second cycle was denoted as initial capacity, which is shown in Table 6.

(Amount of Generated Gas)

After the storage characteristic test, gas in each battery was collected, which was then analyzed by a gas chromatograph for the amount thereof. Note that nitrogen, oxygen and the vapor of the electrolyte were excluded as measurement error from the amount of gas measured. The remaining amount of gas is shown in Table 6.

(Capacity after High Temperature Storage)

After the storage characteristic test, each battery was cycled twice under the same conditions as the pre-charge/discharge. The rate of discharge capacity at the second cycle to the initial capacity is shown in Table 6 as the capacity retention rate after storage.

(Stability During Overcharge)

Each of the test batteries, three of each, was discharged at a current of 40 mA to 3.0 V. A thermocouple for measuring the battery temperature was then attached to the side of the battery case. Subsequently, the battery was continuously charged at 200 mA in an environment of 25° C. The charge was terminated when the battery temperature reached 80° C. The battery temperature was then monitored thereafter. The number of batteries reaching 120° C. out of three batteries is shown in Table 6.

TABLE 6

| Battery | Initial capacity (mAh) | Capacity retention rate after storage (%) | Amount of gas generated during storage (ml) | Stability during overcharge (Number of batteries reaching 120° C. out of 3 batteries) |
|---|---|---|---|---|
| A | 200 | 99 | 0.2 | 0/3 |
| L-1 | 168 | 98 | 0.1 | 0/3 |
| L-2 | 182 | 98 | 0.2 | 0/3 |
| L-3 | 189 | 98 | 0.2 | 0/3 |
| M | 198 | 98 | 0.2 | 0/3 |
| N | 201 | 99 | 0.4 | 0/3 |
| O-1 | 201 | 99 | 1.2 | 0/3 |
| O-2 | 202 | 96 | 2.9 | 0/3 |
| P | 203 | 88 | 0.4 | 1/3 |
| Q | 202 | 97 | 0.3 | 0/3 |
| R | 196 | 99 | 0.2 | 0/3 |
| S | 188 | 99 | 0.2 | 0/3 |
| T | 207 | 97 | 0.7 | 3/3 |
| U | 203 | 98 | 0.4 | 0/3 |
| V | 194 | 100 | 0.1 | 0/3 |
| W | 189 | 99 | 0.1 | 0/3 |
| X | 193 | 99 | 0.1 | 0/3 |
| Y-1 | 200 | 99 | 0.2 | 0/3 |
| Y-2 | 200 | 98 | 0.2 | 0/3 |
| Y-3 | 200 | 99 | 0.3 | 0/3 |
| Y-4 | 199 | 99 | 0.2 | 0/3 |
| Y-5 | 200 | 99 | 0.2 | 0/3 |
| Y-6 | 199 | 99 | 0.3 | 0/3 |

As can be seen from Table 5, the batteries of EXAMPLE 2 exhibited a better balance of high input/output characteristic and high temperature storage characteristic than the batteries B, C, G, J and K of EXAMPLE 1. However, Table 6 indicates that when the value of x in the general formula $Li_xNi_{1-(y+z)}Co_yM_zO_2$ was less than 0.95, the positive electrode active material had a slightly low initial capacity (the battery L-1). Conversely, when the value of x exceeded 1.05, the amount of gas generated during high temperature storage was slightly large (the battery O-2). Moreover, when the value of y was less than 0.1, the capacity degraded slightly after high temperature storage (the battery P). When the value of y exceeded 0.35, the positive electrode active material had a slightly low initial capacity (the battery S). When the value of z was less than 0.01, the safety during overcharge is impaired. When the value of z exceeded 0.35, the positive electrode active material had a slightly low initial capacity (the battery W). From the above, it is clear that the positive electrode active material is preferably represented by the formula: $Li_xNi_{1-(y+z)}Co_yM_zO_2$, where the element M is at least one selected from the group consisting of Al, Mn, Ti, Mg, Mo, Y, Zr and Ca, and $0.95 \leq x \leq 1.05$, $0.1 \leq y \leq 0.35$ and $0.01 \leq z \leq 0.35$ are satisfied.

According to the present invention, it is possible to provide a non-aqueous electrolyte secondary battery that exhibits both excellent high input/output characteristic and favorable high temperature storage characteristic. The non-aqueous electrolyte secondary battery of the present invention is particularly suitable for high input/output application, and useful as a power source for driving HEVs or electric tools, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   a positive electrode including a positive electrode active material;
   a negative electrode including a negative electrode active material;
   a separator interposed between said positive electrode and said negative electrode; and
   a non-aqueous electrolyte,
   wherein said positive electrode active material comprises secondary particles, each comprising an aggregate of primary particles, said primary particles comprising a transition metal-containing composite oxide capable of intercalating and deintercalating lithium ions, and
   wherein a value ($V_{Pr}$) defined by the formula:
   $V_{Pr}=(1-C/D)/(A^2 \times B^3)$, is not less than 0.0005 and not greater than 0.04,
   where an average particle size of said primary particles is A µm,
   an average particle size of said positive electrode active material is B µm,
   a tap density of said positive electrode active material is C g/ml, and
   a true density of said positive electrode active material is D g/ml,
   provided that C is from 2.4 to 2.6,
   wherein, said composite oxide is represented by the formula: $Li_xNi_{1-(y+z)}Co_yM_zO_2$, where $1.01 \leq x \leq 1.05$, $0.1 \leq y \leq 0.2$, and $0.02 \leq z \leq 0.1$, and said element M represents Al.

2. The non-aqueous electrolyte secondary battery in accordance with claim 1,
   wherein said average particle size of said primary particles A is from 0.1 to 1.5 µm, and
   said average particle size of said positive electrode active material B is from 3 to 15 µm.

* * * * *